3,429,883
S-BENZOYLOXYMETHYL-THIAMINE ESTERS
Franco D'Alo and Arnaldo Masserini, Milan, Italy, assignors, by mesne assignments, to Warner-Lambert Pharmaceutical Company, Morris Plains, N.J., a corporation of Delaware
No Drawing. Filed Jan. 24, 1967, Ser. No. 611,244
U.S. Cl. 260—256.5       11 Claims
Int. Cl. C07d 51/42; A61k 15/12

ABSTRACT OF THE DISCLOSURE

New O-esters with hydrocarbon acyl groups up to 9-carbon atoms of S-benzoyloxy- or substituted benzoyloxymethyl-thiamines, their non-toxic acid addition salts with organic or inorganic acids, which compounds have prolonged vitamin $B_1$ activity and are useful as nutritional supplements for foods and animal feedstuffs and for therapeutic purposes.

---

This invention relates to now O-esters of derivatives of thiol-form thiamine and to a method for their preparation. More particularly, the invention relates to such derivatives which contain a benzoyloxymethyl grouping linked through the sulphur atom of open-form thiamine, these new compounds being represented by the following structural formula:

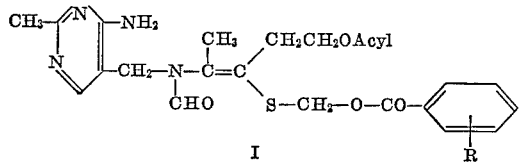

I wherein acyl represents a hydrocarbon acyl group of from 1 to 9 carbon atoms, R represents hydrogen, halogen, particularly fluorine or chlorine, or a lower alkyl of from 1 to 3 crabon atoms. The R substituent may be in any of the available positions of the benzene ring but preferably it is in ortho or para position.

The term "hydrocarbon acyl group of from 1 to 9 carbon atoms" includes lower alkanoyl groups up to 9 carbon atoms, such as formyl, acetyl, propionyl, butyryl, valeryl, isovaleryl, caproyl, oenanthoyl; aroyl groups of from 7 to 9 carbon atoms, such as benzoyl or o-, m- or p-toluyl; cycloalkyl-alkanoyl groups, such as cyclopentyl-formyl, cyclopentyl - acetyl, cyclopentyl - propionyl or cyclohexyl-acetyl; phenyl-alkanol groups such as phenyl-acetyl or phenyl-propionyl; and also acyl residues of aliphatic dicarboxylic acids, such as hemimalonyl or hemisuccinyl. The formic acid esters are particularly preferred.

The new compounds are chemically identified as 3 - (benzoyloxymethylthio) - 4[N-(2 - methyl-4-amino-5-pyrimidinomethyl)N - formyl]-amino-Δ-(3)-pentenol O-esters, but for the sake of brevity, will be named hereinafter S-benzoyloxymethyl-thiamine esters.

This invention also includes non-toxic pharmaceutically acceptable, acid addition salts of the above defined compounds with organic or inorganic acids, for example hydrohalic acids, e.g. hydrochloric, hydrobromic or hydriodic acid, sulphuric, phosphoric, acetic, propionic, lactic, oxalic, succinic, maleic, tartaric, citric, benzoic, mandelic, methanesulphonic and salicylic acids.

The S-benzoyloxymethyl-thiamine esters of this invention and their salts possess remarkable vitamin $B_1$ activity, because they are promptly converted to thiamine in the body. Contrary to the thiamine itself which is little absorbed when orally administered, the compounds of this invention are readily absorbed by oral administration and the absorption is substantially proportional to the dosage. Thus the compounds of the invention permit high vitamin $B_1$ levels in blood and organs, and therefore, they may be usefully employed as nutritional supplements for foods and animal feedstuffs and for therapeutic purposes, particularly for the treatment of conditions resulting from vitamin $B_1$ deficiency.

The compounds of this invention can be formulated for administration by oral, parenteral or intraduodenal route together with a non-toxic pharmaceutical carrier. The compositions may be in dosage unit form containing the active ingredient in an amount from 5 to 250 mg. The administration is advantageously in equal doses one or more times daily to give a daily dosage of from 15 to 100 mg. and preferably from 30 to 500 mg.

The new compounds of this invention can be prepared by reacting the corresponding free S-benzoyloxymethyl-thiamines of formula

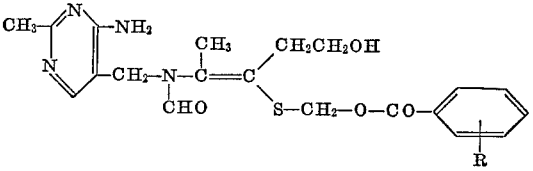

II wherein R has the above-stated meaning, with an esterifying agent, such as an anhydride, an acyl-chloride or a free acid, under mild conditions.

Generally they are prepared by heating the compounds of Formula II with an acid anhydride, such as formyl-acetic anhydride or acetice anhydride, in a pyridine base, preferably pyridine itself. The formic acid esters are preferably prepared by reaction with 99% formic acid at a temperature of 30–80° C.

The S-benzoyloxymethyl-thiamine O-esters which separate at the end of the reaction may be isolated and purified following standard procedures, for example by simple filtration or by evaporation of the solvent and suitable recrystallization. If desired they can be converted into their non-toxic acid addition salts according to known procedures, for example by reacting the bases with an aqueous or alcoholic solution of the appropriate mineral or organic acid. The hydrochloric acid addition salts are preferred.

The free S-benzoyloxymethyl-thiamines starting materials are obtained by reacting a metal or ammonium salt of thiol-form thiamine with a reagent of the formula:

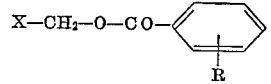

wherein R is as defined above and X is halogen, particularly chlorine.

The following examples are illustrative of the invention.

PREPARATION

A solution of 3.04 g. of sodium salt of thiol-form thiamine in 30 cc. of anhydrous ethyl alcohol is mixed with stirring at room temperature with 1.70 g. of chloromethyl ester of benzoic acid. Stirring is continued at room temperature for about 3 hours, after which 30 cc. of anhydrous ethyl ether is added. The precipitate so obtained, containing sodium chloride together with the final reaction product, is filtered, then suspended in water and filtered again. The sodium chloride is completely removed from the filter cake by repeated washing with water and the S-benzoyloxymethyl-thiamine is dried under vacuum, washed with anhydrous ethyl ether and crystallized from anhydrous ethyl alcohol. Yield: 2.9 g. M.P. 194–195° C.

By following the same procedure, S-o-toluyloxymethyl-thiamine, M.P. 164–165° C., S-p-chlorobenzoyloxymethyl-thiamine, M.P. 168–170° C., S-p-ethylbenzoyloxymethyl - thiamine and S - p - isopropylbenzoyloxymethyl-thiamine are obtained.

Example 1

2 g. of S-benzoyloxymethyl-thiamine are dissolved in 6 cc. of 99% formic acid. The mixture is maintained for 3 hours at 50° C., then it is poured in a saturated sodium bicarbonate solution. A pitchy product separates which is extracted with chloroform. The organic layer is at first washed with a sodium bicarbonate solution, then with water and then is evaporated under vacuum until dryness. On digestion with ethanol-ether 1:9, the residue gives the S-benzoyloxymethyl-thiamine formate of formula:

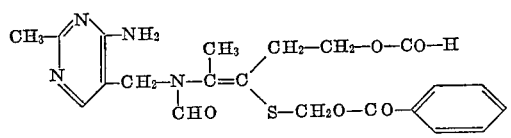

which, after crystallisation from ethanol melts at 135–137° C. (yield: 1.3 g.).

By treating this compound with a solution of hydrochloric acid, the corresponding hydrochloride is obtained.

By operating in an analogous manner the S-o-toluyloxymethyl-thiamine formate, the S-p-toluyloxymethyl-thiamine formate, the S-p-chlorobenzoyloxymethyl-thiamine formate, the S-p-ethylbenzoyloxymethyl-thiamine formate and the S-p-isopropylbenzoyloxymethyl-thiamine formate are obtained and converted in the corresponding hydrochlorides.

Example 2

2.55 g. of acetic anhydride are added to a solution of 2.08 g. of benzoyloxymethyl-thiamine in 200 cc. of anhydrous pyridine and the mixture is maintained at room temperature for 12 hours. After evaporation under vacuum at 50° C., the resulting residue is extracted with chloroform. This solution is washed with water and evaporated to dryness. On digestion with ethanol-ether 1:9, the residue gives the S-benzoyloxymethyl-thiamine acetate of formula:

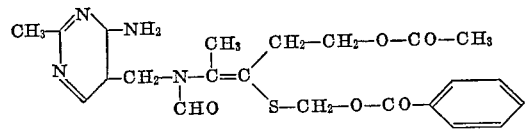

which, after crystallisation from ether melts at 75–77° C. (yield: 1.3 g.).

500 mg. of the compound so obtained are dissolved in little water and treated with diluted hydrochloric acid. The solution is evaporated and the residue purified with ethyl acetate to give the hydrochloride of the above S-benzoyloxymethyl-thiamine acetate, M.P. 190–192° C.

In analogous manner, but operating with oxalic acid in alcoholic solution, the corresponding oxalic acid addition salt is obtained; M.P. 137–140° C. (dec.). Similarly the hydrobromic, phosphoric, tartaric, lactic and methanesulfonic acid addition salts are obtained.

Example 3

1.3 g. of propionic anhydride are added to a solution of 2.08 g. of S-benzoyloxymethyl-thiamine in 200 cc. of anhydrous pyridine and the mixture is maintained for 12 hours at 60° C. After evaporation under vacuum at 60° C. until dryness, the residue is extracted with chloroform, and the chloroform solution washed with water and evaporated until dryness. The residue after digestion with ethanol:ether 1:9 and crystallization first from ethanol then from ether, gives 1.4 g. of S-benzoyloxymethyl-thiamine propionate of formula

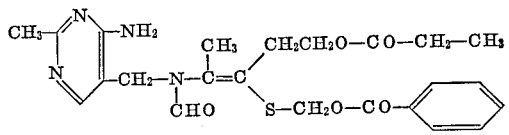

melting at 62–66° C.

By treating, under the same conditions, a pyridine solution of S-benzoyloxymethyl-thiamine with butyric anhydride, valeric anhydride, caproic anhydride and oenanthic anhydride, the butyrate, the valerate, the caproate and the oenanthate, respectively, of S-benzoyloxymethyl-thiamine are obtained and converted into the corresponding hydrochlorides.

Example 4

1.6 g. of benzoic anhydride are added to a solution of 2.08 g. of S-benzoyloxymethyl-thiamine in 200 cc. of anhydrous pyridine and the mixture is maintained 6 hours at 50° C. By operating as described in Example 3 there is obtained the S-benzoyloxymethyl-thiamine benzoate of formula:

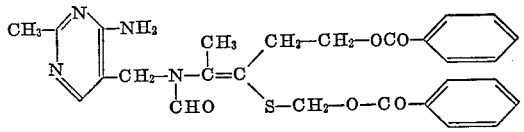

In an analogous manner, the o-toluate, the phenylacetate, the phenylpropionate and the cyclopentylpropionate of S-benzoyloxymethyl-thiamine are obtained.

By treating an alcoholic solution of the above compounds with benzoic or salicylic acids, the corresponding addition salts are obtained.

Example 5

1.5 g. of succinic anhydride are added to a solution of 2.08 g. of S-benzoyloxymethyl-thiamine in 200 cc. of pyridine and the mixture is maintained at 60° C. for an hour. By operating as described in Example 3 there is obtained the S-benzoyloxymethyl-thiamine hemisuccinate of formula:

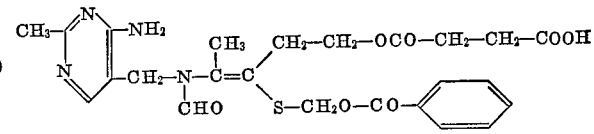

In an analogous manner the corresponding hemimalonate is obtained.

We claim:
1. A member selected from the group consisting of chemical compounds of the formula:

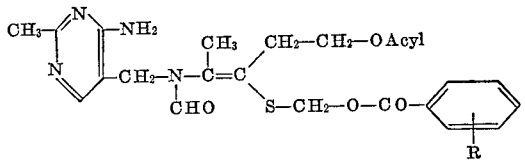

in which acyl is a hydrocarbon acyl group of from 1 to 9 carbon atoms selected from the group consisting of alkanoyl, aroyl, cycloalkylalkanoyl, phenylalkanoyl and the acyl residues of aliphatic dicarboxylic acids, R is selected from the group consisting of hydrogen, halogen and lower alkyl of from 1 to 3 carbon atoms; and nontoxic pharmaceutically acceptable acid addition salts thereof.

2. The compound having the following formula:

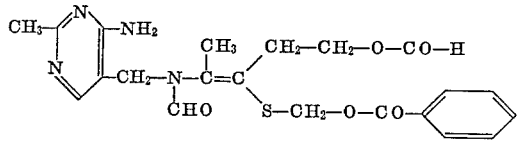

3. The hydrochloric acid addition salt of the compound claimed in claim 2.

4. The compound having the following formula:

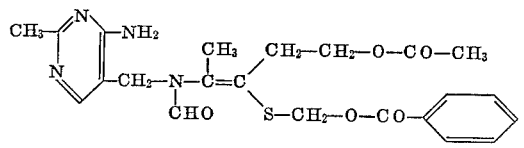

5. The hydrochloric acid addition salt of the compound claimed in claim 4.

6. The oxalic acid addition salt of the compound claimed in claim 4.

7. The compound having the following formula:

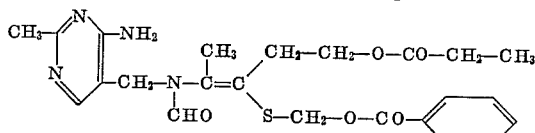

8. The compound having the following formula:

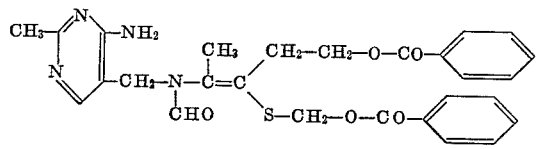

9. The compound having the following formula:

10. The compound having the following formula:

11. The compound having the following formula:

References Cited

UNITED STATES PATENTS 3,324,124   6/1967   Murakami et al. ---- 260—256.5

ALEX MAZEL, *Primary Examiner*

R. J. GALLAGHER, *Assistant Examiner.*

U.S. Cl. X.R.

99—2, 11; 260—476; 424—255